(12) United States Patent
Vissa et al.

(10) Patent No.: US 10,523,806 B2
(45) Date of Patent: Dec. 31, 2019

(54) CONFIGURING TRANSCEIVER FOR USING AUGMENTED REALITY RELATIVE POSITIONING

(71) Applicant: Motorola Mobility LLC, Chicago, IL (US)

(72) Inventors: Sudhir C. Vissa, Bensenville, IL (US); Vivek K. Tyagi, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/996,860

(22) Filed: Jun. 4, 2018

(65) Prior Publication Data

US 2019/0373095 A1   Dec. 5, 2019

(51) Int. Cl.
| | | |
|---|---|---|
| *H04M 1/725* | (2006.01) | |
| *G06T 19/00* | (2011.01) | |
| *G06F 3/0484* | (2013.01) | |

(52) U.S. Cl.
CPC ...... *H04M 1/7253* (2013.01); *G06F 3/04842* (2013.01); *G06T 19/006* (2013.01); *H04M 1/72583* (2013.01)

(58) Field of Classification Search
CPC ....... H04W 4/21; H04W 84/18; H04W 88/16; H04W 8/005; H04M 1/72522; H04M 1/737
See application file for complete search history.

(56) References Cited

U.S. PATENT DOCUMENTS

| | | | | |
|---|---|---|---|---|
| 2017/0367766 A1* | 12/2017 | Mahfouz | ................ | A61B 34/10 |
| 2019/0167352 A1* | 6/2019 | Mahfouz | ................ | A61B 34/10 |
| 2019/0212106 A1* | 7/2019 | Bortz | ...................... | F41A 33/02 |

OTHER PUBLICATIONS

Gaebel, "Looks Good to Me: Authentication for Augmented Reality," Thesis submitted to Virginia Polytechnic Institute and State University, May 2, 2016.
Park et al., "Improving Position Estimation on RFID Tag floor Localization Using RFID Reader Transmission Power Control," Proceedings of the 2008 IEEE, Feb. 21-26, 2009.

* cited by examiner

*Primary Examiner* — Diane D Mizrahi
(74) *Attorney, Agent, or Firm* — Amerson Law Firm, PLLC

(57) ABSTRACT

A method includes detecting a user selection of a region in an augmented reality display of a first device, determining a relative position of the region in the augmented reality display, configuring a parameter of a transceiver of the first device based on the relative position, and establishing a connection between the first device and a second device using the transceiver configured with the parameter.

20 Claims, 3 Drawing Sheets

CONFIGURING TRANSCEIVER FOR USING AUGMENTED REALITY RELATIVE POSITIONING

BACKGROUND

Field of the Disclosure

The disclosed subject matter relates generally to mobile computing systems and, more particularly, to establishing a connection between devices by configuring a transceiver using augmented reality relative positioning.

Description of the Related Art

Mobile devices provide powerful platforms for communication, data exchange and collaboration. In addition to employing cellular for communication, mobile devices employ a variety of other connection types for communicating, such as Wi-Fi connections with a network or peer connections (i.e., paired connections) with other devices. Establishing such connections typically involves a configuration or pairing process that includes scanning for nearby devices (e.g., wireless access points or peer devices), selecting the intended device, and entering a one-time password (OTP) or other passkeys and user ID into the mobile device. Some devices only support single peer connections. If a particular device is already paired, the user must take actions to terminate the first connection to allow pairing of a second connection. These processes may be time consuming and cumbersome.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art, by referencing the accompanying drawings.

The use of the same reference symbols in different drawings indicates similar or identical items.

DETAILED DESCRIPTION OF EMBODIMENT(S)

Figure 1:
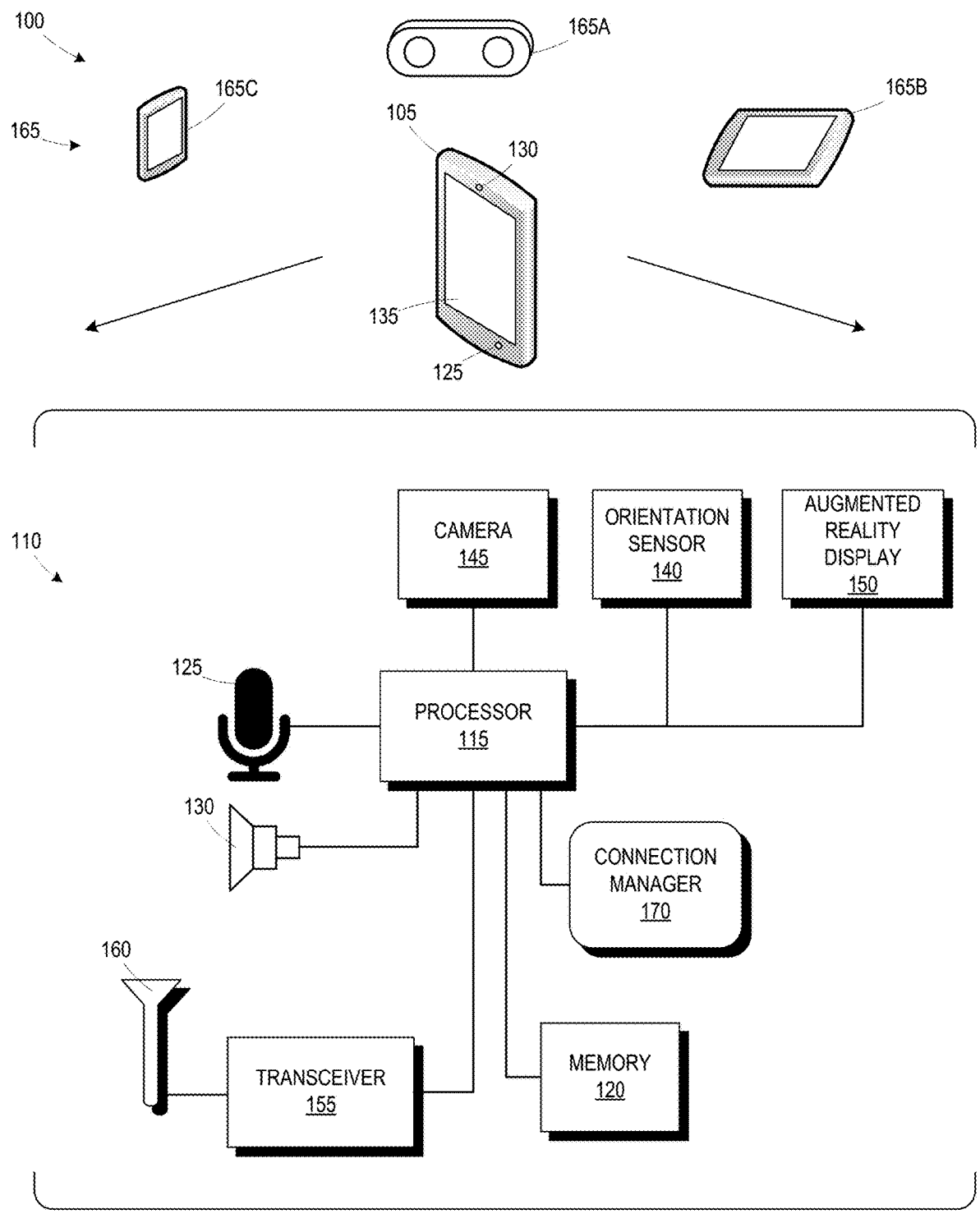
FIG. 1 is a simplified block diagram of a communication system, wherein a connection is established between devices by configuring a transceiver using augmented reality relative positioning, in accordance with some embodiments.
Figure 2:
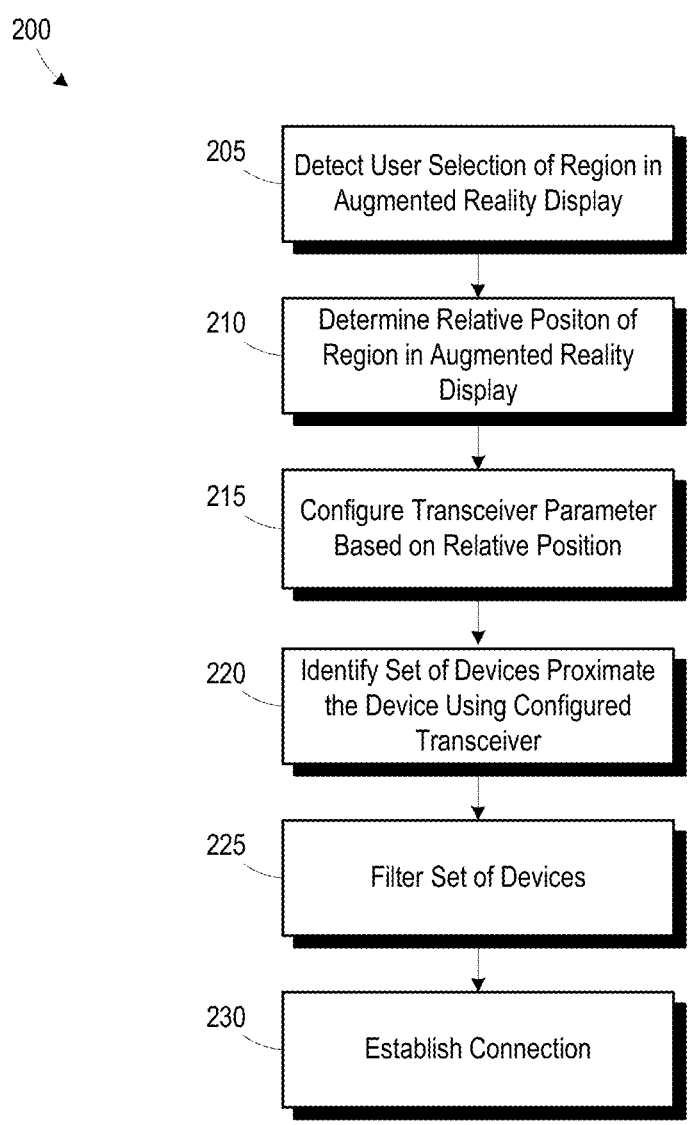
FIG. 2 is a flow diagram of a method for establishing a connection between devices by configuring a transceiver using augmented reality relative positioning, in accordance with some embodiments.
Figure 3:
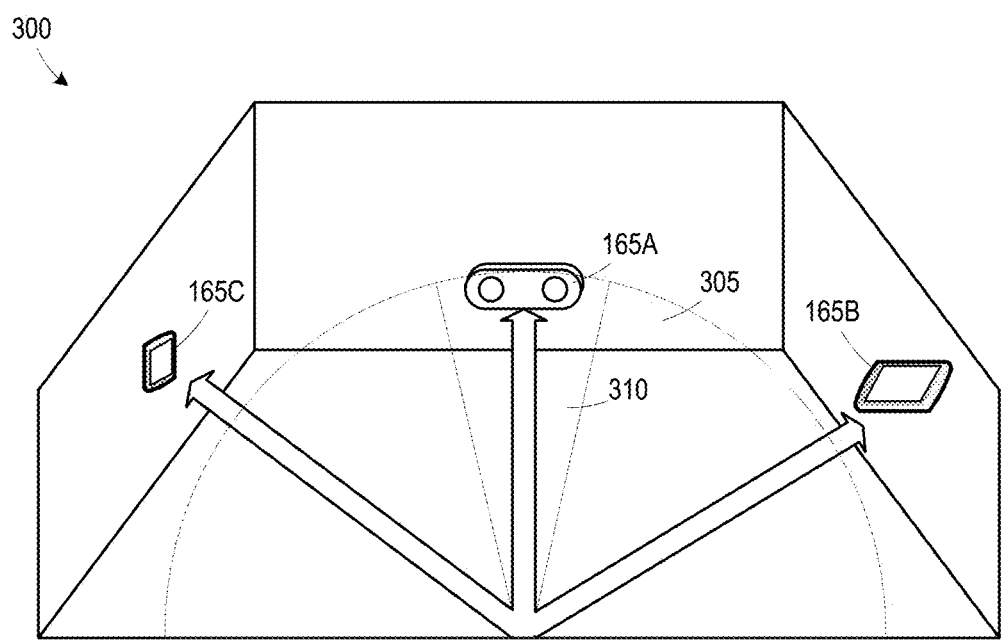
FIG. 3 is a diagram illustrating an augmented reality display employed by the system of FIG. 1 for determining relative position, in accordance with some embodiments.

FIGS. 1-3 illustrate example techniques for establishing a connection between devices by configuring a transceiver using augmented reality relative positioning. In one example, a user indicates a particular device that is to be connected in the augmented reality display. A relative position of a region in the display including the particular device is determined. A transceiver of the device generating the augmented reality display is configured based on the relative position. A connection may be established between the devices.

FIG. 1 is a simplified block diagram of a communication system 100 including a device 105, in accordance with some embodiments. The device 105 implements a computing system 110 including, among other things, a processor 115, a memory 120, a microphone 125, a speaker 130, a display 135, an orientation sensor 140 (e.g., an accelerometer, magnetometer, mercury switch, gyroscope, compass or some combination thereof), a camera 145, and an augmented reality display 150. The augmented reality display 150 may be an external interface (e.g., headset with separate display), or it may be implemented using the camera 145 and the display 135 of the device 105 (e.g., which may be hand held by the user or mounted to a headset). The memory 120 may be a volatile memory (e.g., DRAM, SRAM) or a non-volatile memory (e.g., ROM, flash memory, etc.), or a combination thereof. The device 105 includes a transceiver 155 for transmitting and receiving signals via an antenna 160 (e.g., one or more antennas). The transceiver 155 may include one or more radios for communicating according to different radio access technologies, such as cellular, Wi-Fi, Bluetooth®, ZigBee, etc. The transceiver 155 may also communicate over a packet-based communication network, such as the Internet.

As illustrated in FIG. 1, the device 105 may be positioned near one or more other devices 165, such as a speaker 165A, a notebook 165B or a mobile device 165C. In various embodiments, the devices 105, 165 may be embodied in handheld or wearable devices, such as laptop computers, handheld computers, tablet computers, mobile devices, telephones, cameras, personal data assistants, music players, game devices, speakers, wearable computing devices and the like.

In the device 105, the processor 115 may execute instructions stored in the memory 120 and store information in the memory 120, such as the results of the executed instructions. Some embodiments of the processor 115, the memory 120 and the microphone 125 may be configured to implement a connection manager 170 and perform portions of a method 200 shown in FIG. 2 and discussed below. For example, the processor 115 may execute the connection manager 170 to establish a connection between the devices 105, 165. The connection may be initiated responsive to a trigger event (e.g., a connection request from the device 105).

FIG. 2 is a flow diagram of a method 200 for establishing a connection between devices 105, 165 by configuring a transceiver 155 using augmented reality relative positioning, in accordance with some embodiments.

FIG. 3 is a diagram illustrating an augmented reality display 300 employed by the device 105 of FIG. 1 for determining relative position, in accordance with some embodiments. A user of the device 105 interfaces with the augmented reality display 300 to identify a device 165 to which a connection is to be made. As illustrated in FIG. 3, the devices 165A, 165B, 165C are near the user and visible in the augmented reality display 300. The user may point to the desired device 165 to facilitate a connection.

In method block 205, a user selection of a region in the augmented reality display 300 is detected. The user may simply point to the desired device 165 and voice a command, such as "Connect to Device Name". For example, the user may point at the speaker 165A, and indicate "Connect to Speaker."

In method block 210, a relative position of the region in the augmented reality display 300 is determined. In some embodiments, the relative position may include a range. In other embodiments, the relative position may include a range and an angle. Techniques for determining the relative position, such as simultaneous location and mapping (SLAM) techniques, are known in the art, so they are not described in greater detail herein to avoid obscuring the present subject matter.

In method block 215, the connection manager 170 configures a parameter of the transceiver 155, such as the signal strength, based on the relative position (e.g., range) determined in method block 210. The transmission range of the antenna 160 varies with the signal strength. The connection manager 170 may use an equation or a lookup-table, for example, to set the signal strength to adapt the range of the transceiver 155 to limit the range of its transmissions, such as indicated by the arc 305 in FIG. 3.

In some embodiments, the transceiver 155 may have a beam forming or directional antenna 160 that allows its transmissions to be limited to a particular sector of the arc 305, such as the sector 310. In such embodiments, the angle specified by the relative position may be employed to set the transmission sector of the transceiver 155 such that only devices 165 within the range and angle defined by the relative position receive transmissions from the transceiver 155.

In method block 220, the connection manager 170 identifies a set of devices 165 proximate the device 105 using the configured transceiver 155. The connection manager 170 may broadcast a connection query message that reaches nearby devices 165 within the determined range 305 and/or sector 310. Those devices 165 respond to the connection query indicating their availability to connect to the device 105.

In some embodiments, the connection manager 170 may filter the set of devices 165 identified in method block 225. In some embodiments, the set of devices 165 may be filtered based on the device type, which may be parsed from the "Device Name" in the voiced command. For example, if the device name was "Speaker", device types other than speakers may be excluded.

In some embodiments, the set of devices 165 may also be filtered by the angle specified by the relative position. For example, if the transceiver 155 cannot limit its transmissions to a particular sector 310, information from the responses to the query message may be employed to determine a direction of the responding device 165 relative to the device 105. For example, in embodiments where the devices 165 are equipped with multiple input multiple output (MIMO) antennas, they may transmit angle of departure (AoD) information with their query responses. For devices without MIMO capability, the AoD may be estimated using a switching technique. I/Q samples can be transmitted by the device 165 using a predetermined arrangement of time slots. The connection manager 170 can then use the signal received by the device 105 to estimate the AoD data. From the received or estimated AoD data, the connection manager 170 calculates an angle of arrival (AoA) that defines the relative position of each of the devices 165. The connection manger 170 filters the list to remove those devices 165 that are not within the sector 310 determined from the augmented reality relative position. Techniques for estimating the AoD and calculating the AoA are known to those of ordinary skill in the art, and they are defined in industry standards, such as BLUETOOTH® Low Energy (LE), WiFi fine time measurements, etc. Hence, they are not described in detail herein to avoid obscuring the present subject matter.

In method block 230, the connection manager 170 establishes a connection with a particular device 165. The connection may be a peer connection (e.g., BLUETOOTH®), a Wi-Fi connection, a near field communication (NFC) connection, etc. Configuring the transceiver 155 based on the augmented reality relative position limits the set of devices 165 responding to the connection query. If more than one candidate device 165 is in the list after method block 220 and optional method block 225, the user of the device 105 may be queried to select the desired device 165. Limiting the devices 165 responding to the connection query simplifies the connection process, thereby improving the user experience.

In some embodiments, certain aspects of the techniques described above may be implemented by one or more processors of a processing system executing software. The method 200 described herein may be implemented by executing software on a computing device, such as the processor 115 of FIG. 1, however, such methods are not abstract in that they improve the operation of the devices 105, 165 and the user's experience when operating the devices 105, 165. Prior to execution, the software instructions may be transferred from a non-transitory computer readable storage medium to a memory, such as the memory 120 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method includes detecting a user selection of a region in an augmented reality display of a first device, determining a relative position of the region in the augmented reality display, configuring a parameter of a transceiver of the first device based on the relative position, and establishing a connection between the first device and a second device using the transceiver configured with the parameter.

A device includes a transceiver, an augmented reality display, and a processor coupled to the transceiver and the augmented reality display, wherein the processor is to detect a user selection of a region in the augmented reality display, determine a relative position of the region in the augmented reality display, configure a parameter of the transceiver based on the relative position, and establish a connection between the first device and a second device using the transceiver configured with the parameter.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method, comprising:
   detecting a user selection of a region in an augmented reality display of a first device;
   determining a relative position of the region in the augmented reality display;
   configuring a parameter of a transceiver of the first device based on the relative position; and
   establishing a connection between the first device and a second device using the transceiver configured with the parameter.

2. The method of claim 1, wherein the relative position comprises a distance and the parameter comprises a signal strength.

3. The method of claim 1, wherein the relative position comprises a distance and an angle.

4. The method of claim 3, further comprising:
   determining an angle of arrival associated with the second device in the first device; and
   determining that the second device is in the region based on the angle of arrival.

5. The method of claim 1, wherein establishing the connection comprises pairing the first and second devices.

6. The method of claim 1, wherein establishing the connection comprises establishing a Wi-Fi connection.

7. The method of claim 1, further comprising sending a connection query message using the transceiver configured with the parameter.

8. The method of claim 7, further comprising:
   receiving a list of candidate devices responding to the connection query message; and
   filtering the list of candidate devices.

9. The method of claim 8, wherein filtering the list of candidate devices comprises filtering the list of candidate devices based on device type.

10. The method of claim 8, wherein the relative position comprises a distance and an angle, and filtering the list of candidate devices comprises filtering the list of candidate devices based on the angle.

11. A device, comprising:
    a transceiver;
    an augmented reality display; and
    a processor coupled to the transceiver and the augmented reality display, wherein the processor is to detect a user selection of a region in the augmented reality display, determine a relative position of the region in the augmented reality display, configure a parameter of the transceiver based on the relative position, and establish a connection between the first device and a second device using the transceiver configured with the parameter.

12. The device of claim 11, wherein the relative position comprises a distance and the parameter comprises a signal strength.

13. The device of claim 11, wherein the relative position comprises a distance and an angle.

14. The device of claim 13, wherein the processor is to determine an angle of arrival associated with the second device, and determine that the second device is in the region based on the angle of arrival.

15. The device of claim 11, wherein the processor is to establish the connection by pairing the first and second devices.

16. The device of claim 11, wherein the processor is to establish the connection by establishing a Wi-Fi connection.

17. The device of claim 11, wherein the processor is to send a connection query message using the transceiver configured with the parameter.

18. The device of claim 17, wherein the processor is to receive a list of candidate devices responding to the connection query message and filter the list of candidate devices.

19. The device of claim 18, wherein the processor is to filter the list of candidate devices based on device type.

20. The device of claim 18, wherein the relative position comprises a distance and an angle, and the processor is to filter the list of candidate devices based on the angle.

* * * * *